United States Patent [19]

Reibel et al.

[11] Patent Number: 5,697,097
[45] Date of Patent: Dec. 9, 1997

[54] METHOD FOR INCREASING THE ENDURANCE OF AN INFORMATION RECEIVER, PARTICULARLY FOR RADIO PAGING, AND CORRESPONDING RECEIVER

[75] Inventors: Jean-Michel Reibel, Lampertheim; François Antoine Bernhard, Strasbourg, both of France

[73] Assignee: RDS Technologies, France

[21] Appl. No.: 605,192
[22] PCT Filed: Sep. 6, 1994
[86] PCT No.: PCT/FR94/01045
§ 371 Date: Mar. 1, 1996
§ 102(e) Date: Mar. 1, 1996
[87] PCT Pub. No.: WO95/07594
PCT Pub. Date: Mar. 16, 1995

[30] Foreign Application Priority Data

Sep. 9, 1993 [FR] France ............. 93 10745

[51] Int. Cl.$^6$ ............................. H04B 1/16
[52] U.S. Cl. ............................. 455/343; 455/38.3
[58] Field of Search ............. 455/32.1, 38.3, 455/54.1, 343; 370/95.1, 95.3, 329, 337; 340/825.44

[56] References Cited

U.S. PATENT DOCUMENTS

| 5,230,084 | 7/1993 | Nguyen | 455/38 |
| 5,307,349 | 4/1994 | Shloss et al. | 370/95.3 |
| 5,392,287 | 2/1995 | Tiedemann, Jr. et al. | 455/343 |
| 5,430,774 | 7/1995 | Dupuy | 455/54.1 |
| 5,459,457 | 10/1995 | Sharpe | 455/343 |
| 5,544,075 | 8/1996 | Janex | 370/95.3 |
| 5,568,511 | 10/1996 | Lampe | 455/54.1 |

FOREIGN PATENT DOCUMENTS

| 0319219 | 6/1989 | European Pat. Off. |
| 0554941 | 8/1993 | European Pat. Off. |

Primary Examiner—Chi H. Pham
Assistant Examiner—Gertrude Arthur
Attorney, Agent, or Firm—D. A. Casalonga-Josse

[57] ABSTRACT

The information is transmitted on a carrier signal within a plurality of successive time frames each partitioned by a predetermined number of time intervals, each of which is allotted to a predetermined group of receivers. The receivers of each group are furthermore distributed into a predetermined number of identifiable sub-groups of receivers. All the receivers of the group are activated at the start of the corresponding allotted time interval, all the receivers of the group are made to receive service information identifying which are the sub-groups in which the receivers are likely to receive a message, this service information is analysed within each receiver and, before the end of the time interval ($I_3$), a receiver not belonging to one of the designated sub-groups is de-activated.

18 Claims, 3 Drawing Sheets

FIG. 2
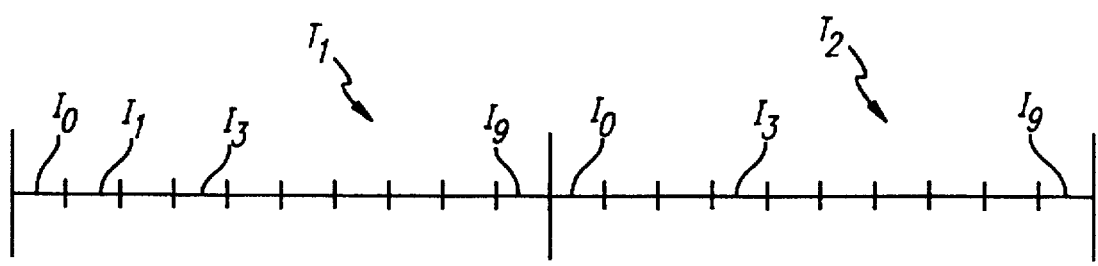
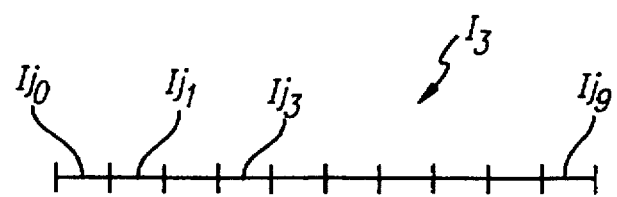
FIG. 3

METHOD FOR INCREASING THE ENDURANCE OF AN INFORMATION RECEIVER, PARTICULARLY FOR RADIO PAGING, AND CORRESPONDING RECEIVER

BACKGROUND OF THE INVENTION

1. Field of the Invention

The invention relates to the reception and the processing of information received by a receiver with a view to increasing the endurance of the latter, the said information being transmitted on a carrier signal within a plurality of time frames each partitioned into a predetermined number of intervals, each of which is allotted to a group of receivers.

2. Description of the Related Art

The invention applies advantageously, but is not limited, to radio paging. Such receivers operate in intermittent mode in the course of successive time intervals which are allotted to them, and are in a quiescent state outside of these intervals particularly in order to economize on their energy source. In their operating phase they can receive simple calls being represented by an audible signal being given off indicating to the holder of the receiver that someone is trying to contact him. The latter must then call a predetermined telephone number. The receivers, in their operating phase, can also receive alphanumeric messages which are displayed on their screen. All these receivers are generally equipped with a high-speed microprocessor. In effect, the microprocessor, in the course of the operating interval allotted to the receiver and during which the latter receives the information transmitted, has to process a considerable flow of data by reason of the information throughput which can vary from 512 bauds to 1200 bauds or more. Over the duration of this generally short operating interval, for example of the order of 6 seconds, the microprocessor particularly has to carry out synchronization, error detection, error correction and decoding processing.

The necessity of providing a high-speed microprocessor entails considerable current consumption and the use of a stable power supply voltage generally centred around 5 volts. However, such constraints are difficult to reconcile with the usual energy source for this type of receiver, the source generally consisting of a single cell element.

So as to minimize the current consumption necessary for the operation of the receiver, the applicant, in his French Patent Application No. 92 14 617, has proposed deferring the processing of the received data, with respect to their reception proper.

The invention here affords another solution to this problem of endurance of such receivers.

SUMMARY OF THE INVENTION

The invention hence first of all proposes a method for increasing the endurance of a free-standing information receiver, particularly a portable radio-paging receiver, the said information being transmitted on a carrier signal within a plurality of successive time frames each partitioned into a predetermined number of time intervals each of which is allotted to a predetermined group of receivers; a method in which the receivers of each group being furthermore distributed into a predetermined number of identifiable sub-groups of receivers, all the receivers of the group are activated at the start of the corresponding allotted time interval, all the receivers of the group are made to receive service information identifying which are the sub-groups in which the receivers are likely to receive a message, this service information is analysed within each receiver and, before the end of the time interval, a receiver not belonging to one of the designated sub-groups is de-activated.

In other words, according to the invention, all the receivers of a group, advantageously at the start of the corresponding allotted time interval, are given an indication of the sub-groups to which the receivers belong which are intended to receive a message in the course of this time interval. Consequently, the receivers belonging to the other sub-groups, not being concerned by this transmission, can be immediately de-activated, that is to say can enter a battery-saving or quiescent mode in which they no longer "listen" to the radio frequency channel (in the case of an application to radio paging). Such receivers will then be reactivated only when the corresponding time interval of the following frame occurs. If it is assumed that, statistically, the messages are uniformly distributed over all the receivers, it is thus possible greatly to increase the endurance of the receivers.

In general, each receiver is allocated a unique identifier consisting of a plurality of information items, (for example a digital word composed, in decimal notation, of a plurality of figures), in which one of them produces a correspondence between the receiver and its group; in this case, it is particularly advantageous to use at least one additional information item of the identifier in order to form a correspondence between the receiver and its sub-group.

It is also possible to use two additional information items of the identifier in order to form the said correspondence between the receiver and its sub-group. This makes it possible more finely to select the receivers concerned with the messages and to leave a larger number of receivers "asleep". Nevertheless, in this case, in order not to take up too much of the transmission resources on the carrier frequency, the possible messages concerning receivers of a first part of the sub-groups are transported within the time interval of a first frame (for example each odd frame) while the possible messages intended for the receivers of the remaining part of the sub-groups are transported during the time interval of the following frame (for example each even frame).

The subject of the invention is also a free-standing information receiver, particularly a radio-paging receiver, the said information being transmitted on a carrier signal within a plurality of successive time frames each partitioned into a predetermined number of intervals, each of which is allotted to a predetermined group of receivers, comprising control means able to activate the receiver at the start of the corresponding allotted time interval of each frame in order to authorize processing of the information transported on the carrier signal; according to a general characteristic of the invention, this receiver comprises a memory containing data for identification of the receiver making it possible to associate the receiver with a predetermined sub-group of receivers within the corresponding group; analysis means are also provided, in the course of the allotted time interval, which are able to receive service information designating one or more sub-groups and to carry out analysis processing of this service information having regard to the identification data. The control means de-activate the receiver before the end of the time interval in the event of disagreement between the identification data and the service information. The term "disagreement" has to be interpreted widely. There will thus be disagreement between identification data and service information when the receiver associated with this identification data does not belong to one of the sub-groups designated by the service information.

The control means may be able to keep the receivers of the designated sub-groups activated throughout the duration of the time interval. They may also, in the course of this time interval, after analysis of the service information, momentarily de-activate the receivers of at least some of the sub-groups designated by the said service information. This is the case especially when the time interval is subdivided in terms of time into subintervals associated respectively with the various sub-groups and intended respectively to contain the messages intended for the receivers of the corresponding sub-groups.

BRIEF DESCRIPTION OF THE DRAWINGS

Other advantages and characteristics of the invention will become apparent on reading the detailed description of an embodiment and of an implementation of the invention which is not in any way limiting, illustrated on the attached drawings in which.

DESCRIPTION OF THE PREFERRED EMBODIMENTS

The detailed description which will now be given relates to a radio-paging receiver using radio frequency-type transmission and reception, as was mentioned above, the receivers according to the invention my be applied in other fields, such as, for example, file archiving, or may also use other links such as infrared links.

Figure 1:
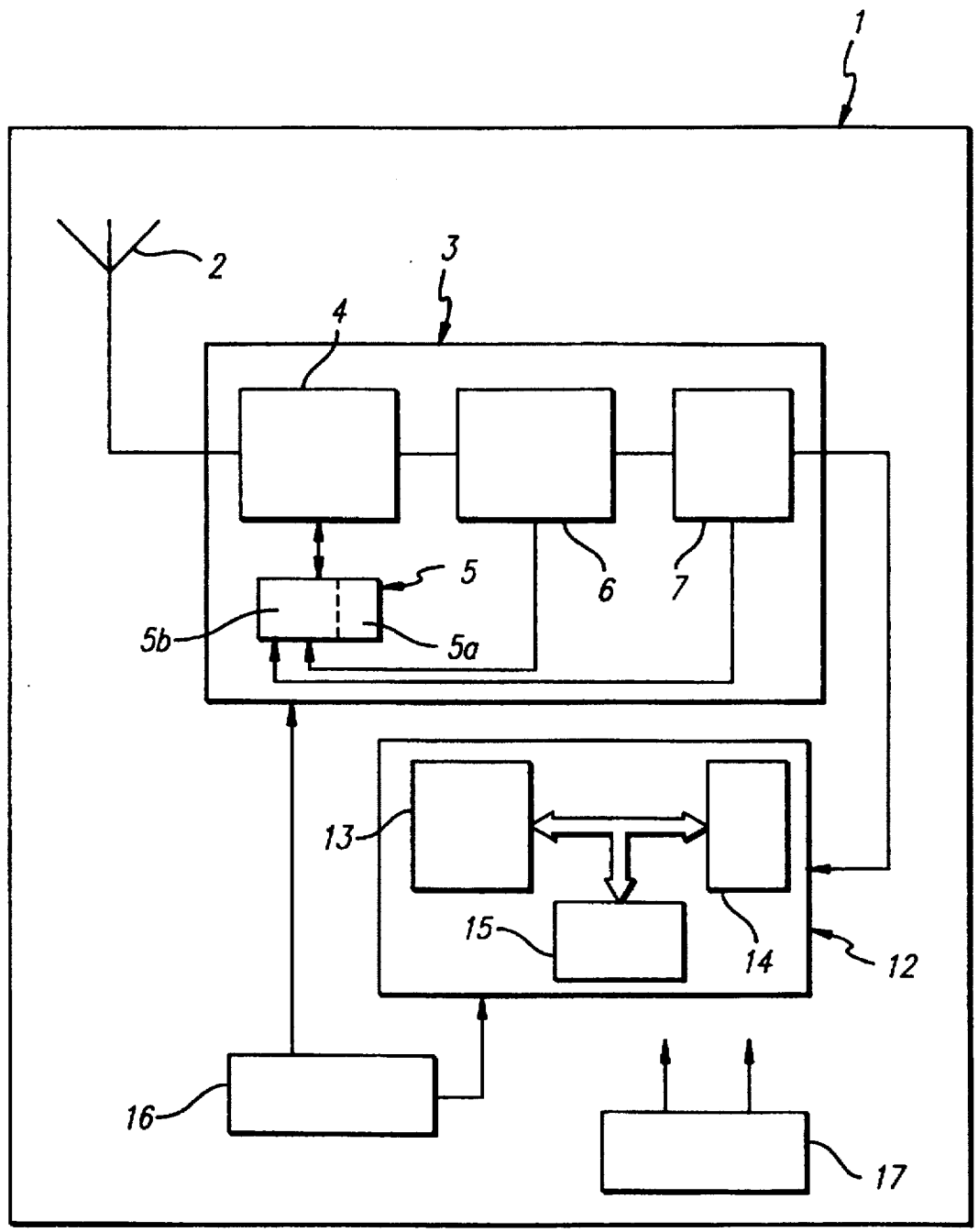
FIG. 1 is a block diagram of an embodiment of a receiver according to the invention, FIGS. 2 and 3 indicate a time-based division relating to the operation of a receiver according to the invention.

In FIG. 1, the reference I designates a radio-paging receiver equipped with a receiving antenna 2, connected to receiving means 3 including, at the top, a high-frequency stage 4 followed by a specific circuit 6 for detecting loss of synchronization and by a specific circuit 7 for detecting and correcting transmission errors. The reception means 3 further comprise carrier frequency detection means 5, interacting with the high-frequency stage 4, and including a frequency discriminator 5a showing up a frequency mismatch of the local oscillator, as well as a specific circuit 5b for seeking and automatically controlling the frequency of the carrier signal.

The output of the reception means is linked to analysis means 12 including a microprocessor 13, for example 4 bits, associated, via a communications bus, with a random-access memory 14, and with a read-only memory 15.

Control means 16 are able momentarily to activate the reception means 3 and the analysis means 12 by delivering corresponding control pulses to these two means respectively. These control means can be incorporated conventionally within the microprocessor itself, or can also be produced as a conventional specific external circuit. Likewise, with the exception of the input stage 4, at least a part of the reception means may be functionally incorporated within the microprocessor and be produced as software.

The whole of the receiver is powered by power supply means 17 including a cell element associated with a DC-DC converter used to raise the voltage of this cell element to that necessary for the operation of the microprocessor.

In the read-only memory of the receiver there is stored a unique indentifier consisting of a plurality of figures, typically six, a, b, c, d, e, f (having values from 0 to 9 in decimal notation). The use of some of these figures will be gone into in more detail later.

Figure 4:
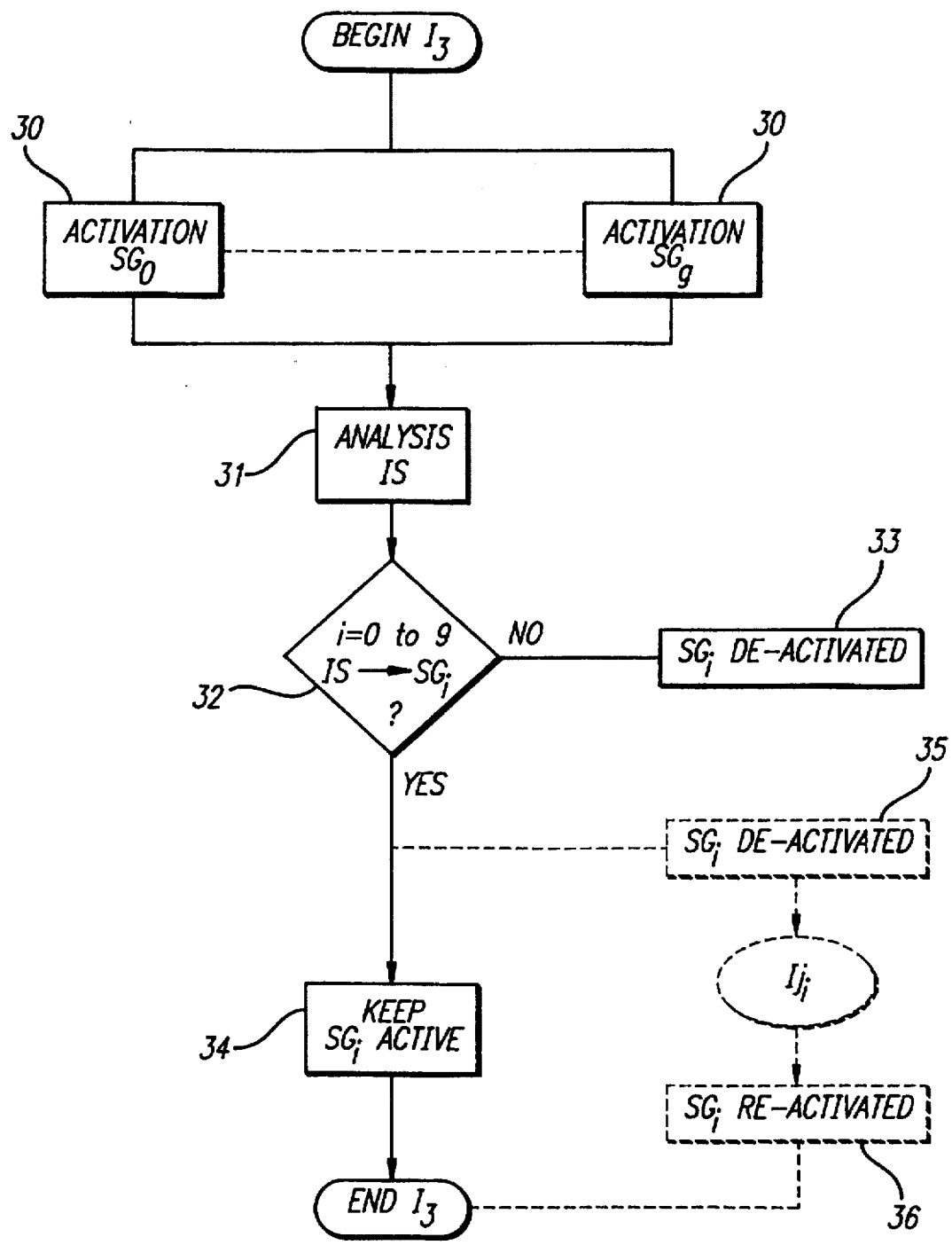
FIG. 4 illustrates a mode of implementing the invention.

FIGS. 2 to 4 are now more particularly referred to in order to describe the operation of such a receiver.

Several transmission standards currently govern information transmission in radio paging. One of them is a European standard relating to the RDS (Radio Data System) radio data-broadcasting system, well known to the person skilled in the art.

In a general way, whatever the standard used, the invention provides for the information to be transmitted on a carrier signal (radio frequency in the case of radio paging) within a plurality of successive time frames with a predetermined frame duration. Two successive time frames $T_1$ and $T_2$ have been represented in FIG. 2. These frames have a duration of 1 minute, in the RDS standard for example. Each frame is partitioned into a predetermined number (here ten) of time intervals $I_0-I_9$ of which each of them is allotted to a group of receivers. A receiver belongs to a given group, and thus the corresponding time interval is allocated, as determined by the last figure f of the identifier.

More precisely, all the receivers having an identifier in which the last figure is f belong to the same group. The ten possible values of the figure f correspond to the ten time intervals $I_0-I_9$.

The invention makes provision to subdivide each group $G_i$ of receivers into a predetermined number of subgroups $SG_j$. To do that, at least one additional figure of the identifier of the receiver is advantageously used. It is thus possible to use either the penultimate figure e, or the pair formed by the fourth and fifth figures of the identifier d, e. In the first case, if it is assumed that the figure e can take the values 0 to 9, then, for each group of receivers, ten sub-groups are obtained. The fact of a receiver belonging to one of the sub-groups is thus conditioned by the value of the figure e of its identifier. Increasing the number of figures of the identifier taken into account for determining sub-groups makes it possible to increase the number of sub-groups and thus more finely to select the receivers likely to be concerned with a message transmitted. However, too great a number of sub-groups would lead to too much of the transmission resources of the system being occupied. The applicant has observed that the use of a single additional figure for determining sub-groups already allowed an appreciable saving in current consumption, especially in the case of transmission of alphanumeric messages. The use of a number of additional figures greater than two has been judged to be pointless, for the moment, having regard to the too great commitment of the resources used with respect to the economy of saving achieved with respect to the use of two additional figures only.

It is assumed now in the example described that the receiver concerned belongs to the fourth group $G_3$ associated with the fourth interval $I_3$. It is also assumed that it belongs to the fourth sub-group $SG_3$.

Referring now more particularly to FIG. 4, it is seen that the occurrence of the interval $I_3$ allotted to the group $G_3$ of receivers causes activation of each receiver of the group $G_3$ by the corresponding control means 16. It is assumed, obviously, that all the receivers are already synchronized in terms of time to the successive frames. Thus, even if no message is intended to be transmitted, in the course of this time interval $I_3$, to certain receivers of certain sub-groups $SG_0-SG_9$, all these receivers are nevertheless activated, that is to say "wakened", in order to receive and analyse the information received from the carrier signal.

The invention then provides for the transmission in the course of this time interval $I_3$, and generally at the start of the latter, for example after a specific synchronization and checking header, of service information IS designating which are the sub-groups the receivers of which are likely to receive a message concerning them.

The analysis means of each receiver then analyse (step 31) the contents of this service information having regard to the identifier contained in memory. In the event of disagreement between this service information and the identifier, that is to say if the additional figure or figures designating the sub-group do not correspond to the designations contained in the service, information, the control means 16 of all the receivers of each sub-group not designated de-activate the receiver without waiting for the normal de-activation at the end of the allotted time interval which occurs in the conventional receivers of the state of the art (steps 32 and 33). In other words, these receivers, which have no need to remain activated, that is to say listening out to the radio frequency channel, can be de-activated rapidly, that is to say just after analysis of the service information, so as to spare their power supply means.

In a particular mode of implementing the invention, there may be provision for the service information IS to consist of an n-bit word where n is equal to the number of sub-groups of a group or interval. Each bit is moreover associated in a one-to-one way with a sub-group. It is possible to make provision to order, preferably, the sub-groups with respect to the value of their additional figure(s) and to order the bits in the same way. The first bit will then be associated with the first sub-group corresponding to e=0 and the 10th bit (in the case of 10 sub-groups) will be associated with the 10th sub-group corresponding to e=9. The processing for analysis of the service information by the analysis means of the receiver will then comprise the analysis of the value of the bit with position corresponding to its sub-group. If this bit is at 1, for example, the corresponding sub-group is designated. If it is at zero, the corresponding sub-group is not designated.

As far as the receivers of the sub-groups are concerned which are designated in the service information, two variants are possible.

One of them, illustrated in solid line in FIG. 4, provides for all the receivers of all the subgroups thus designated (step 34) to be kept in the active state until the end of the interval $I_3$. Another solution, illustrated in dashes in FIG. 4, makes it possible yet further to economize on the current consumption in some of the receivers. In effect, if provision is made furthermore (FIG. 3) to subdivide each time interval, in terms of time, into as many subintervals $Ij_0$–$Ij_9$ as there are sub-groups, the various sub-groups and the associated subintervals being ordered in the same way, for example with respect to the value of their supplementary figure e, and if there is provision for transmitting only the messages intended for the receivers of a sub-group in the corresponding subinterval, it is then possible (step 35) momentarily to de-activate the receivers of a sub-group $SG_i$ for which the reception of the messages concerning them will occur only in the course of the interval $Ij_i$. The receivers of this group $SG_i$ will then be reactivated solely when the corresponding time subinterval $Ij_i$ occurs.

Practically, in the example described, if it is assumed that the sub-groups and the time subintervals associated are stored in increasing order corresponding to increasing values of the figure e, the receiver belonging to the sub-group $SG_3$ will be able to be de-activated after reception and analysis of the service information IS until the fourth sub-interval $Ij_3$ occurs.

Needless to say, the subdivision of the time intervals into time subintervals is not linked directly to the possible momentary de-activation of the designated sub-groups. In other words, this subdivision can be provided for with sending of the messages concerning the sub-groups in the corresponding subintervals, even if the receivers of the designated sub-groups remain activated throughout the time interval.

In the event that two additional figures of the identifier are used to determine the sub-groups, one hundred additional sub-groups (from 00 to 99) are obtained, with decimal notation of 0 to 9 for each of the supplementary figures. However, the processing of these hundred sub-groups over one time interval of a frame would risk saturating the transmission system. Thus, there is advantageously provision for distributing these hundred sub-groups over two corresponding time intervals of two successive time frames $T_1$, $T_2$ in such a way as artificially to obtain fifty sub-groups per time interval. It is thus possible to envisage, during each even frame, sending messages only to receivers whose subgroups correspond to even values of the pair d, e and sending possible messages only to the receivers of the sub-groups corresponding to odd values of the pair d, e during each odd frame. In practice, the parity of the pair d, e can be determined simply by the parity of the figure e. In such a variant, the service information would comprise a 50-bit word.

Moreover, in order advantageously to ensure compatibility of the invention with the present-day receivers operating conventionally, there is provision for allocating preferably to the receivers according to the invention an identifier of which at least one of the figures, for example a, is coded in hexadecimal and has a value greater than 9. In this case, and if provision is made to arrange the service information within the frames after sending of the identifiers of the receivers or at least after sending of the hexadecimal-coded figure, the analysis means of the conventional receivers, which are not capable of recognizing an address greater than 9 in hexadecimal, will consider such a figure as not relating to their identifier, will therefore not analyse the frame and will not be disturbed by the presence of the service information and of the time subintervals.

The invention thus makes it possible to obtain an appreciable saving in current consumption with respect to a conventional use which provides for activation of all the receivers of a group during the whole duration of the corresponding allotted time interval. Thus, in the case of ten sub-groups determined by the value of a single additional figure of the identifier (figure e for example) it is possible, for transmission of numerical messages only, to obtain a maximum saving of 90% of current consumption in the case in which all the messages sent relate to one or more receivers of only one sub-group.

In the case of transmission of alphanumeric-type messages, the applicant assesses that this saving in current consumption may vary between 60 and 90% according to circumstances.

In the case where the service information relates to two additional figures of the identifier, the applicant assesses that the saving in current consumption, for transmission of numerical messages, may vary between about 58% and about 98% and between about 92% and 98% for transmission of alphanumeric messages.

We claim:

1. A method for increasing the endurance of a free-standing information receiver, particularly a portable radio-paging receiver, the said information being transmitted on a carrier signal within a plurality of successive time frames ($T_1$, $T_2$) each partitioned into a predetermined number of time intervals ($I_0$–$I_9$) each of which is allotted to a predetermined group of receivers, a method in which the receivers of each group being furthermore distributed into a predetermined number of identifiable sub-groups of receivers ($SG_0$–$SG_9$), all the receivers of the group ($G_3$) are activated (30) at the start of the corresponding allotted time interval ($I_3$), all the receivers of the group are made to receive service information (IS) identifying which are the sub-groups in which the receivers are likely to receive a message, this service information is analysed (31) within each receiver and, before the end of the said time interval ($I_3$), a receiver not belonging to one of the designated sub-groups is de-activated (33).

2. A method according to claim 1, in which each receiver is allocated a unique identifier consisting of a plurality of information items (a, b, c, d, e, f), one of which (f) produces a correspondence between the receiver and its group, characterized in that at least one additional information item (e), for example two (d, e), of the identifier are used to form a correspondence between the receiver and its sub-group.

3. A method according to claim 2, characterized in that two additional information items (d, e) of the identifier are used to form the said correspondence between the receiver and its sub-group, the possible messages concerning receivers of a first part of the sub-groups being transported within the time interval ($I_3$) of a first frame ($T_1$), and the possible messages concerning the receivers of the remaining part of the sub-groups being transported within the corresponding time interval ($I_3$) of the following frame ($T_2$).

4. A method according to claim 1, characterized in that an n-bit word is used as service information (IS), n being equal to the number of sub-groups, each bit being associated in a one-to-one way with a sub-group, and the analysis of the service information within each receiver includes the analysis of the value of the bit associated with the sub-group to which the receiver belongs.

5. A method according to claim 1, characterized in that the receivers of the sub-groups designated by the service information (IS) are kept activated (34) throughout the duration of the corresponding allotted time interval.

6. A method according to one of claim 1, characterized in that the sub-groups are ordered within each group, and, with the various sub-groups, there are respectively associated respective time sub-intervals ($Ij_i$) of the time interval, ordered in the same way, and within each of which the possible messages are sent, intended for one or more receivers of the sub-group concerned, and in that the receivers of the sub-groups designated ($SG_3$) by the service information are de-activated (35) until the corresponding time subintervals ($Ij_3$) occur.

7. A method according to claim 1, wherein a receiver not belonging to one of the designated subgroups is de-activated just after analysis of the service information.

8. A method according to claim 2, wherein one of the information items (a) of the identifier has a value greater than 9 and is coded in hexadecimal.

9. A method according to claim 3, wherein the sub-groups are ordered within each group, and, with the various sub-groups, there are respectively associated respective time subintervals of the time interval, ordered in the same way, and within each of which the possible messages are sent, intended for one or more receivers of the sub-group concerned, and wherein the receivers of the sub-groups designated by the service information are de-activated until the corresponding time sub-intervals occur.

10. A free-standing information receiver, particularly radio-paging receiver, the said-information being transmitted on a carrier signal within a plurality of successive time frames each partitioned into a predetermined number of intervals, each of which is allotted to a predetermined group of receivers, comprising control means (16) to activate the receivers(i) at the start of the corresponding allotted time interval ($I_3$) of each frame in order to authorize processing of the information transported on the carrier signal, characterized in that it comprises a memory (15) containing data for identification (e) of the receiver making it possible to associate the receiver (1) with a predetermined sub-group ($SG_3$) of receivers within the corresponding group, and analysis means (13), in the course of the allotted time interval, to receive service information (IS) designating one or more sub-groups and to carry out analysis processing of this service information having regard to the identification data (e), and in that the control means (16) de-activate the receiver (1) before the end of the time interval ($I_3$) in the event of disagreement between the identification data and the service information.

11. A receiver according to claim 10, characterized in that the memory contains an identifier allocated in a one-to-one way to the receiver, and including a plurality of information items (a, b, c, d, e, f) one of which (f) determines the group, and in that the identification data is formed from at least one additional information item of the identifier, for example two (d e).

12. A receiver according to claim 1, characterized in that the service information (IS) includes an n-bit word, n being equal to the number of sub-groups, each bit being associated in a one-to-one way with a sub-group, and in that the analysis means of each receiver are able to analyse the value of the bit associated with the sub-group to which the receiver belongs, so as to determine whether the receiver belongs to a designated sub-group or not.

13. A receiver according to claim 10, characterized in that the control means (16) are able to keep the receivers of the designated sub-groups activated, throughout the duration of the time interval ($I_3$).

14. A receiver according to claim 10, characterized in that the control means (16) are able, in the course of the time interval, after analysis of the service information, momentarily to de-activate the receivers of at least some of the sub-groups designated by the said service information.

15. A receiver according to claim 11, characterized in that one of the information items (a) of the identifier has a value greater than 9 and is coded in hexadecimal.

16. A receiver according to claim 10, wherein the control means de-activate the receiver not belonging to one of the designated subgroups just after analysis of the service information in the event of disagreement between the identification data and the service information.

17. A receiver according to claim 10, wherein the sub-groups are ordered within each group, and, with the various sub-groups, there are respectively associated respective time sub-intervals of the time interval, ordered in the same way, and within each of which the possible messages are sent, intended for one or more receivers of the sub-group concerned, and wherein the receivers of the sub-groups designated by the service information are de-activated until the corresponding time sub-intervals occur.

18. A receiver according to claim 11, wherein the sub-groups are ordered within each group, and, with the various sub-groups, there are respectively associated respective time sub-intervals of the time interval, ordered in the same way, and within each of which the possible messages are sent, intended for one or more receivers of the sub-group concerned, and wherein the receivers of the sub-groups designated by the service information are de-activated until the corresponding time sub-intervals occur.

* * * * *